Figure 1:
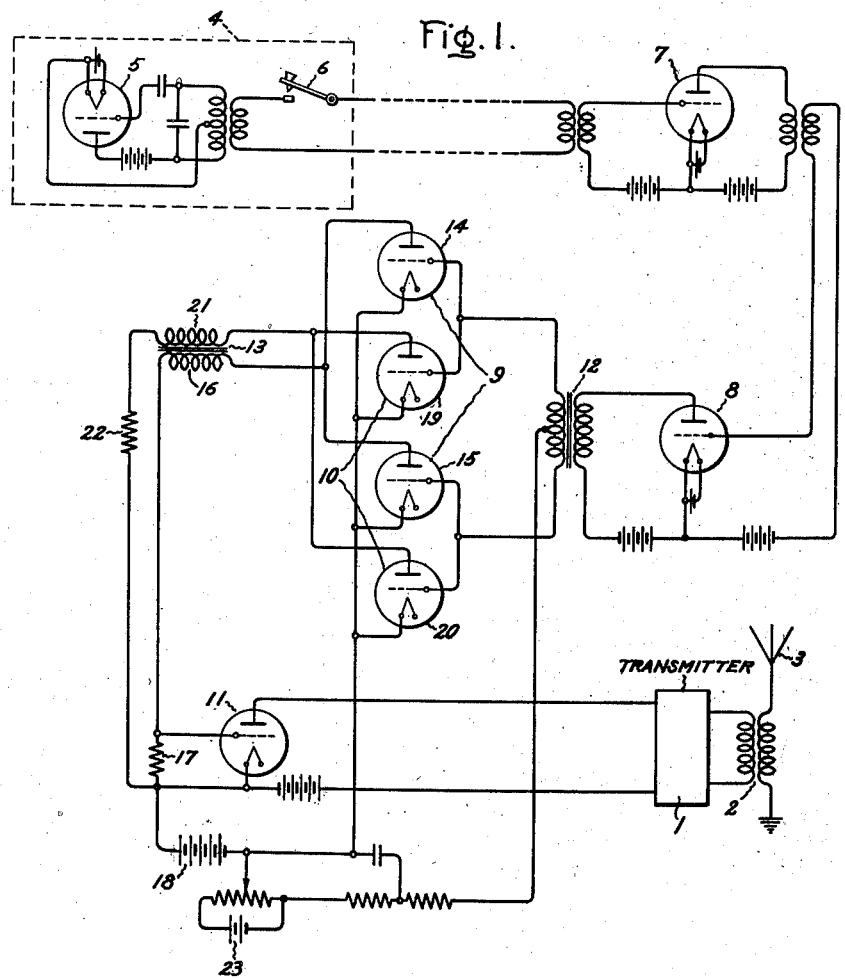

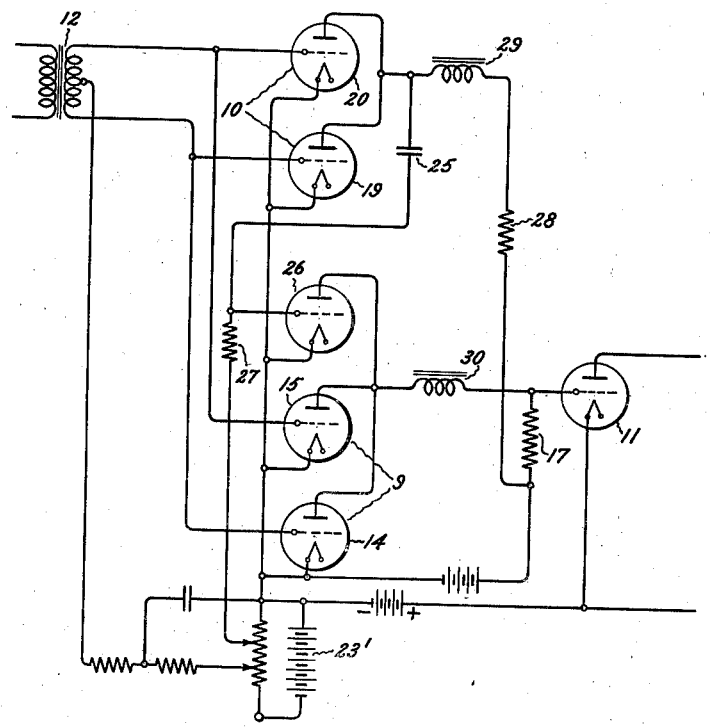

Patented May 3, 1938

2,116,390

UNITED STATES PATENT OFFICE 2,116,390

TRANSMITTER SYSTEM

Paul C. Gardiner, Scotia, N. Y., assignor to General Electric Company, a corporation of New York Application March 10, 1936, Serial No. 68,075

7 Claims. (Cl. 178—66)

My invention relates to transmitting systems and more particularly to signal transmitting systems in which desired signals are transmitted by keying, or impulsing a transmitted carrier wave.

In certain types of signaling, as for example facsimile transmission, the signal impulses to be transmitted by means of high frequency carrier current are produced in an alternating current wave of lower frequency. Where these impulses are of comparatively low rate the lower frequency alternating current wave may be rectified, smoothed by means of any suitable smoothing network thereby to eliminate the alternating current ripple and then utilized to control one or more of the discharge devices of the high frequency transmitter. It has been found, however, that where the impulses are of very rapid rate the smoothing network employed to eliminate the undesired ripple is likely also to eliminate the interruptions between impulses thereby causing a substantially continuous electromotive force to be supplied to the discharge devices of the transmitter.

This result is apparent from a consideration of the operation of a smoothing network in which shunt capacitance is utilized. This capacitance becomes charged during periods of maximum impressed electromotive force and tends to discharge during periods of minimum impressed electromotive force. If a steady electromotive force having a superimposed variable component, or ripple, be supplied to the network, the time required for the charging and discharging of the capacitance may be such that the instantaneous voltage of the capacitance does not follow the form of the impressed variable component but instead assumes a certain steady value between the maximum and minimum of the impressed variable voltage. Thus the impressed ripple component is removed.

If now the supplied voltage be keyed, or impulsed, at a very rapid rate, as in accordance with desired signals, a similar result occurs. The shunt capacitance assumes a certain charge during each impulse but may not become completely discharged between impulses with the result that a certain electromotive force is continuously supplied to the load circuit. The more rapid the impulsing of the impressed voltage the more steady the voltage supplied to the load becomes until at a certain high rate the output voltage does not sufficiently represent the impressed voltage to cause a faithful reproduction of the impressed signals, or in fact, to be useful for signaling purposes.

It has heretofore been proposed to solve the above problem by providing a circuit which operates to convert the rapid signal impulses of oscillatory electromotive force into a plurality of electromotive forces uniformly displaced in phase and depending in amplitude upon the oscillatory signal electromotive force. The plurality of electromotive forces thus formed are rectified and combined in a circuit which impresses the same on the keying circuit of the transmitter. The proper operation of this method of keying a transmitter is dependent upon the use of phase splitting circuits for producing a plurality of electromotive forces bearing the correct phase and amplitude relation with respect to each other.

Accordingly it is an object of my invention to provide means whereby direct current impulses of high frequency having a minimum of alternating current ripple are produced in accordance with interruptions in an alternating current wave and supplied to the keying circuit of a transmitter, which means operates in a uniformly satisfactory manner irrespective of frequency variations of the interrupted alternating current wave and is of such a nature that the keying circuit of the transmitter is substantially free from shunt capacitance.

In accordance with my invention I attain the above object by converting the signal impulses of oscillatory electromotive force into two pulsating unidirectional electromotive forces having ripple components therein, reacting the two pulsating electromotive forces upon each other with the ripple components thereof in opposed phase relation thereby to eliminate the ripple component from one of the electromotive forces and thereafter impressing the electromotive force having the ripple component eliminated therefrom on the keying circuit of the transmitter.

The novel features which I believe to be characteristic of my invention are set forth with particularity in the appended claims. My invention itself, however, both as to its organization and method of operation, together with further objects and advantages thereof, will best be understood by reference to the following specification taken in connection with the accompanying drawings, in which Figs. 1 and 2 illustrate circuits having different embodiments of my invention included therein.

Referring to Fig. 1 of the drawings I have illustrated diagrammatically at 1 a high frequency transmitter. This transmitter may comprise a high frequency carrier wave oscillation generator of any form well known in the art and is coupled by means of a transformer 2 to a suitable load circuit which may comprise an antenna 3.

In the upper left-hand portion of Fig. 1 I have shown a rectangle 4 to represent any source of alternating electromotive force having rapidly occurring interruptions therein. Thus, within the rectangle I have shown conventionally an electron discharge oscillation generator 5, the output circuit of which includes a key 6 which may be operated at a rapid rate by any suitable means (not shown) as, for example, high speed telegraphic keying relays or facsimile transmission apparatus.

As applied to facsimile transmission systems, the rectangle 4 may be understood to represent a facsimile transmitter of present well-known construction in which a beam of light is employed to scan the material to be transmitted, and in which alternating current impulses are transmitted under control of the light beam in accordance with the light and dark areas of the material being scanned. Thus, these interruptions may occur at a very rapid rate and the frequency of the interrupted oscillation may vary over a considerable range.

In order to key or impulse the transmitter 1 in accordance with the impulses in the alternating current output from the apparatus represented by the rectangle 4 additional means comprising cascade-connected electron discharge amplifiers 7 and 8, full wave rectifiers 9 and 10 and a direct current amplifier 11 are provided.

Thus, oscillations from the apparatus 4 are amplified by the amplifiers 7 and 8 and supplied to the full wave rectifiers 9 and 10 by the coupling transformer 12. Each of the full wave rectifiers 9 and 10 has included in its output circuit one of the windings of an inductive coupling device shown as a transformer 13. The full wave rectifier 9 comprises the two electron discharge devices 14 and 15 having their control electrodes connected to opposite terminals of the secondary of the transformer 12 and their anodes connected together in the conventional manner. Included between the anodes of the devices 14 and 15 and the cathodes thereof is one winding 16 of the transformer 13, a resistance 17 connected between the control grid and cathode of the amplifier 11, and a source of anode potential 18. Similarly the full wave rectifier 10 comprises a pair of electron discharge devices 19 and 20 having their input electrodes connected to opposite terminals of the secondary winding of the transformer 12 and their anodes connected together in the conventional manner. Connected in the output circuit of this full wave rectifier is a second winding 21 of the transformer 13, a resistance 22 equal in value to that of the resistance 17, and the source of anode potential 18. A suitable source of biasing potential 23 is provided for biasing the control grids of the electron discharge devices 14, 15, 19 and 20 to the proper potential with respect to their respective cathodes. During each closed period of the key 6 the control grid of direct current amplifier 11 is biased negatively with respect to the cathode of the latter amplifier by the IR drop across the input resistance 17 which is included in the anode-cathode circuit of the full wave rectifiers 14 and 15.

In the operation of the above-described circuit the high frequency oscillations generated at the source 5 are interrupted at a high rate of speed by the keying device 6 and are supplied to the full wave rectifiers 9 and 10 through the amplifiers 7 and 8 and the transformer 12. The impulses of oscillatory electromotive force are converted into unidirectional impulses of electromotive forces having ripple components therein by the two full wave rectifiers 9 and 10. These pulsating electromotive forces react upon each other with the ripple components thereof in opposed phase relation by the transformer 13. The ripple components of the two currents produced by these electromotive forces in the windings 16 and 21 tend to cancel each other so that the current flowing from the winding 16 through the resistance 17 is substantially free from any ripple. This, of course, means that the negatively biasing voltage developed, during each closed period of key 6, between the terminals of the resistance 17 by the current flowing therethrough has a very small ripple component therein.

It will be seen that the self-inductance of each of the windings 16 and 21 and the mutual inductance between the two windings opposes instantaneous changes in the current flowing through the two windings and function in the manner of a filter choke coil. This inductance tends to oppose the build-up and decay of current at the beginning and end of each signal impulse. However, at keying speeds ordinarily employed in the applications referred to above each of the signal impulses consists of several alternations of the signal oscillations. Accordingly the transformer 13 may be designed with a comparatively low inductive reactance to currents of the keying frequency and with a fairly high inductive reactance to currents of the impulse current ripple frequency. This insures the desired elimination of the ripple components from the currents traversing the windings 16 and 21 without any substantial smoothing of the impulses themselves. In other words, the character of each impulse in its relation to a preceding impulse is preserved and at the same time the objectionable ripple component is eliminated from each of the individual unidirectional impulses of current. Thus, if a properly designed transformer be employed the time required for build-up and decay of the current at the beginning and end of each impulse will not be detrimental to the proper operation of the system under ordinary operating conditions since this time interval will be small as compared to the duration of the shortest impulse and as compared to the time interval between successive signal impulses.

It will be understood that the resistance 22 is inserted in the current path including the transformer winding 21 for the purpose of insuring equal and opposed ripple components of current in the two parallel connected circuits between the anodes of the two full wave rectifiers 9 and 10 and the source of anode potential 18. The turn ratio between the windings 16 and 21 of the transformer 13 is unity and by providing the resistance 22 equal in value to the value of the resistance 17 currents of equal magnitude and displaced 180° in phase are caused to flow in the two parallel connected circuits.

Referring to Fig. 2 of the drawings I have illustrated a modified form of my improved circuit wherein the transformer 13 is eliminated, thereby to eliminate any inductive effect on the current flowing in the circuit including the control resistor 17. In this circuit only a portion of the system is shown and like reference characters refer to similar elements of the circuit illustrated in Fig. 1.

In the circuit of Fig. 2 the bucking ripple component for opposing the ripple produced by the full wave rectifier 9 is produced in the output circuit of the full wave rectifier 10 and is impressed on the anode circuit of the rectifier 9 through a coupling condenser 25 and a phase reversing electron discharge device 26. Connected between the input electrodes of the discharge device 26 is a resistance 27 across which the opposing ripple component generated by the rectifier 10 is impressed. A suitable biasing potential derived from the source 23' is included between one terminal of the resistance 27 and the cathode of the discharge device 26. This potential is of sufficient magnitude normally to maintain the discharge device 26 biased just to anode current cut-off condition. In order to complete the direct current path of the anode current generated by the rectifier 10 a circuit is provided which includes a resistance 28 and a ripple choke inductance 29. It will be understood that the resistance 28 is approximately equal in value to the resistance 17 and operates to equalize the currents flowing in the output circuits of the two full wave rectifiers. The effect of the choke 29 is balanced in the output circuit of the rectifier 9 by a second choke 30 which functions to smooth out any ripple not eliminated by the reaction of the two opposed ripple components in the anode circuit of the rectifier 9.

In the operation of the circuit illustrated in Fig. 2 the ripple component of voltage produced across the output terminals of the rectifier 10 is reversed in phase by the discharge device 26 and impressed across the output terminals of the rectifier 9 by the coupling condenser 25 and the discharge device 26. By a proper selection of circuit elements the amplitude of this ripple component is made substantially equal to that produced across the terminals of the output circuit of the rectifier 9 and being in opposed phase relation thereto, a cancellation of the two components results. However, since only the ripple component of the current generated by the rectifier 10 is impressed on the output circuit of the rectifier 9 by the discharge device 26, the direct current component produced in the anode circuit of this rectifier is substantially unaffected by the combination of the two currents and flows through the circuit including the choke and the resistance 17.

It will of course be understood that the choke coils 29 and 30 are chosen to present a low inductive reactance to currents of the signal impulse frequency and a relatively high inductive reactance to currents of the ripple frequency. In this manner a smoothing action of any remaining high frequency ripple is obtained without impairing the character of the signal impulses.

In either of the circuits illustrated in Figs. 1 and 2 the polarities of the electromotive forces produced across the resistance 17 are such that the grid of the electron discharge device 11 is driven negative during each interruption of the output from the apparatus 4, and the magnitude of the negative potential supplied to the grid of the discharge device 11 is such that the anode current of the discharge device 11 is reduced to zero thereby completely to interrupt the transmission of high frequency carrier energy by the transmitter during each interruption of the output from the apparatus 4.

It will be observed that each of the two circuits illustrated is substantially free from shunt capacitance connected across the channel between the apparatus 4 and the input circuit of the keying device 11. Accordingly it will be understood that the character of the interruptions in the output from the apparatus 4 will not be dependent upon the charge and discharge rate of condensive reactance. It will further be seen that the operation of either of the two circuits shown is substantially independent of the frequency of oscillations generated by the signal source, since the superimposition and cancellation of the ripple components occurs irrespective of any change in the frequency of the oscillations generated by the source 4. Accordingly it will be understood that my improved circuit arrangements are particularly adaptable for use in keying high frequency signal carriers which are susceptible to frequency variations.

While I have shown particular embodiments of my invention, it will of course be understood that I do not wish to be limited thereto since many modifications in the circuits may be made, and I contemplate by the appended claims to cover all such modifications as fall within the true spirit and scope of my invention.

What I claim as new and desire to secure by Letters Patent of the United States is:

1. In combination, a transmitter comprising a source of oscillations and a keying circuit, a source of rapid impulses of oscillatory electromotive force, said impulses occurring at rapid keying speeds, means including a full wave rectifier for converting said oscillatory impulses into sharply defined impulses of unidirectional electromotive force having a ripple component therein and to supply said impulses of unidirectional electromotive force to a circuit free of elements having any substantial energy storage capacity at the frequency of said impulses, means including a second full wave rectifier for substantially eliminating the ripple component from said impulses of electromotive force substantially without affecting the remaining components of said impulses, and means for impressing the remaining components of said unidirectional impulses of electromotive force on said keying circuit, whereby said transmitter is keyed by said sharply defined impulses of unidirectional electromotive force free from ripple.

2. In combination, a transmitter comprising a source of oscillations and a keying circuit, a source of rapid impulses of oscillatory electromotive force, means including a full wave rectifier for converting said impulses into impulses of unidirectional electromotive force having a ripple component therein and to supply said impulses of unidirectional electromotive force to a circuit free of elements having any substantial energy storage capacity at the frequency of said impulses, means including a second full wave rectifier for producing impulses of electromotive force having a ripple component equal in magnitude to the ripple component of said first electromotive force impulses, means for supplying said second ripple component to said circuit in opposed phase relation to said first ripple component thereby substantially to eliminate the ripple component from said impulses of directional electromotive force, and means for impressing said impulses of unidirectional electromotive force on said keying circuit.

3. In combination, a transmitter comprising a source of oscillations and a keying circuit, a source of rapid impulses of oscillatory force representing signals, means including a full wave rectifier for converting said impulses into impulses of unidirectional electromotive force having a ripple component therein and to supply said impulses of unidirectional electromotive force to a circuit free from elements having any substantial energy storage capacity at the frequency of said impulses, means including a second full wave rectifier for producing impulses of electromotive force having a ripple component equal in magnitude to the ripple component of said first electromotive force impulses, means for superimposing said second ripple component on said first ripple component in opposed phase relation, thereby substantially to eliminate the ripple from said first circuit, and means for supplying said unidirectional impulses to said keying circuit, whereby the unidirectional impulses supplied to said keying circuit are free from ripple and faithfully represent said signals.

4. In combination, a transmitter comprising a source of oscillations, a source of rapid oscillatory impulses of electromotive force representing facsimile signals, means including two full wave rectifiers for converting said rapid impulses of oscillatory electromotive force into two pulsating unidirectional electromotive forces having ripple components therein and to supply said impulses of unidirectional electromotive force to a circuit free from elements having any substantial energy storage capacity at the frequency of said impulses, means for reacting said ripple components upon each other in opposed phase relation in said circuit thereby substantially to eliminate the ripple component from said circuit, whereby said impulses in said circuit faithfully represent said facsimile signals, and means to key said transmitter in accordance with said impulses in said circuit.

5. In combination, a transmitter comprising a source of oscillations and a keying circuit, a source of rapid impulses of oscillatory electromotive force, means including a full wave rectifier for converting said impulses of oscillatory electromotive force into impulses of unidirectional electromotive force having a ripple component therein, said rectifier having an output circuit free from elements having any substantial energy storage capacity at the frequency of said impulses, a second full wave rectifier having an input circuit connected to said source for producing an electromotive force having a ripple component equal in magnitude to said first ripple component, means for reacting said ripple components upon each other in opposed phase relation in said output circuit thereby substantially to eliminate both ripple components, and means for impressing the remaining components of said first electromotive force impulses on said keying circuit, whereby the impulses supplied to said keying circuit are substantially free from ripple and faithfully represent said impulses of oscillatory electromotive force.

6. In combination, a transmitter comprising a source of oscillations and a keying circuit, said keying circuit including an electron discharge device having a control grid and a cathode, a resistance connected between said control grid and cathode, a source of rapid impulses of oscillatory electromotive force representing signals, means including a full wave rectifier for converting said impulses of oscillatory electromotive force into impulses of electromotive force having a ripple component therein, said rectifier having an output circuit including said resistance and free from elements having any substantial energy storage capacity at the frequency of said signals, means including a second full wave rectifier for deriving from said source of impulses of oscillatory electromotive force impulses of unidirectional electromotive force having a ripple component equal in magnitude to said first ripple component, and means for superimposing said second ripple component on said first impulses of unidirectional electromotive force in opposed phase relation to the ripple component thereof thereby substantially to eliminate the ripple component from said output circuit, whereby the potential on said resistance substantially faithfully represents said signals.

7. In a system for keying a transmitter in accordance with rapid impulses of oscillatory electromotive force, said means comprising an electron discharge device having a grid and cathode, means to control said transmitter in accordance with the potential between said grid and cathode, a resistance between said grid and cathode, a pair of rectifiers, means to supply said impulses of oscillatory electromotive force to said rectifiers for rectification thereby, said resistance being connected in the output of one of said rectifiers, said output being free from elements having any appreciable energy storage capacity at the frequency of said impulses, whereby unidirectional impulses appear on said resistance faithfully representing said rapid impulses but having a ripple component having the frequency of said oscillatory electromotive force, means to supply a ripple component from the other of said rectifiers to said output in opposed phase to the ripple component produced in said output by said first rectifier thereby to neutralize said ripple component on said resistance whereby said transmitter is faithfully keyed in accordance with said rapid impulses.

PAUL C. GARDINER.